(12) United States Patent
Williams et al.

(10) Patent No.: US 11,939,139 B2
(45) Date of Patent: Mar. 26, 2024

(54) APPARATUS, SYSTEM, AND METHOD OF PROVIDING A SHEET PRODUCT REPLENISHMENT MONITOR

(71) Applicant: NYPRO INC., Clinton, MA (US)

(72) Inventors: Amanda Williams, Clinton, MA (US); Antonio Belmontes, Clinton, MA (US)

(73) Assignee: NYPRO INC.

( * ) Notice: Subject to any disclaimer, the term of this patent is extended or adjusted under 35 U.S.C. 154(b) by 0 days.

(21) Appl. No.: 17/114,356

(22) Filed: Dec. 7, 2020

(65) Prior Publication Data

US 2021/0188524 A1 Jun. 24, 2021

Related U.S. Application Data

(63) Continuation of application No. 16/972,282, filed on Dec. 4, 2020, and a continuation of application No. PCT/US2019/035987, filed on Jun. 7, 2019.

(60) Provisional application No. 62/682,039, filed on Jun. 7, 2018.

(51) Int. Cl.
*B65D 83/08* (2006.01)
(52) U.S. Cl.
CPC ................. *B65D 83/0894* (2013.01)
(58) Field of Classification Search
CPC ............. G01B 11/026; A47K 10/32; A47K 2010/3266
See application file for complete search history.

(56) References Cited

U.S. PATENT DOCUMENTS

| | | | |
|---|---|---|---|
| 2011/0131714 A1* | 6/2011 | Remijn | A47K 10/32 4/233 |
| 2012/0278228 A1* | 11/2012 | Rubinstein | G07F 17/0092 221/6 |
| 2013/0218730 A1* | 8/2013 | Zosimadis | G07F 13/04 705/28 |
| 2013/0240554 A1* | 9/2013 | Strahlin | A47K 10/32 221/1 |
| 2014/0367401 A1* | 12/2014 | Stralin | A47K 10/424 221/6 |
| 2017/0022045 A1* | 1/2017 | Ray | G07F 13/025 |
| 2017/0202410 A1* | 7/2017 | Epperley | A47K 10/426 |

(Continued)

FOREIGN PATENT DOCUMENTS

| | | |
|---|---|---|
| JP | H0797002 A | 4/1995 |
| WO | 2009070678 A2 | 6/2009 |
| WO | 2018044276 A1 | 3/2018 |

OTHER PUBLICATIONS

European Extended Search Report issued in EP23199307.2, dated Nov. 6, 2023, 6 pages.

*Primary Examiner* — Jonathan M Hansen
(74) *Attorney, Agent, or Firm* — Riverside Law LLP

(57) ABSTRACT

An apparatus, system and method for a consumable sheet-product level monitoring dispenser for association with a sheet-product filled consumable. The embodiments include at least a receiver for receiving the consumable upon insertion thereof; at least one sensor associated with at least one opening in the receiver; a sensing module for receiving sheet-product level data from the at least one sensor; and a communications module for communicating the sheet-product level to at least a mobile device display and over at least one network to at least one back end module.

20 Claims, 4 Drawing Sheets

(56) References Cited

U.S. PATENT DOCUMENTS

2020/0142374 A1\* 5/2020 Wegelin .................. G01F 25/00
2021/0188524 A1\* 6/2021 Williams ............. G06Q 10/087

\* cited by examiner

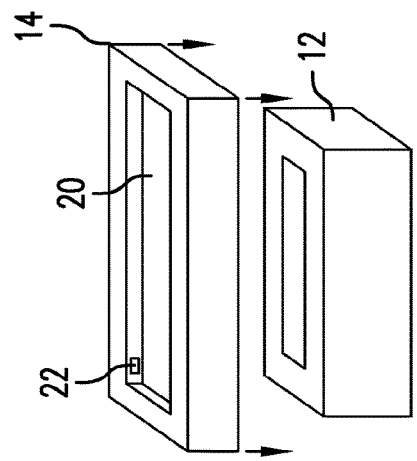
FIG.2A
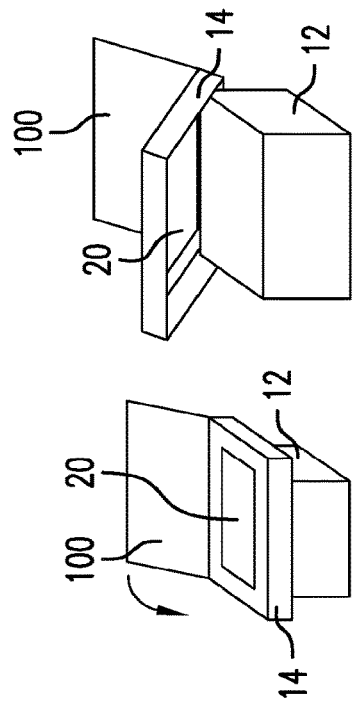
FIG.2C
FIG.2B
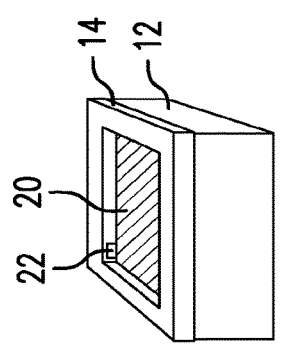
FIG.1A
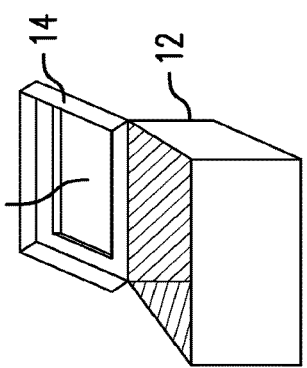
FIG.1B
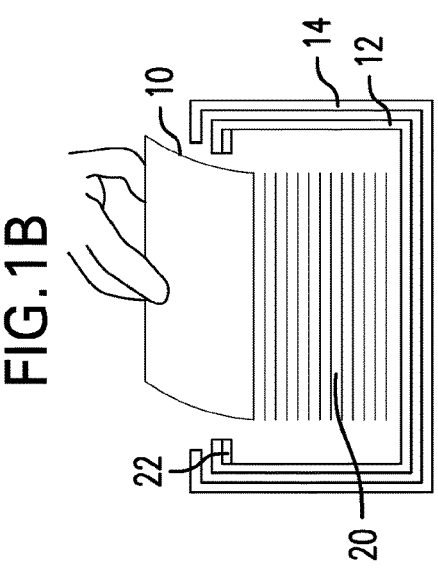
FIG.1C

APPARATUS, SYSTEM, AND METHOD OF PROVIDING A SHEET PRODUCT REPLENISHMENT MONITOR

CROSS-REFERENCE TO RELATED APPLICATION

This application is a Continuation patent application of U.S. patent application Ser. No. 16/972,282, filed Dec. 4, 2020, entitled: APPARATUS, SYSTEM, AND METHOD OF PROVIDING A SHEET PRODUCT REPLENISHMENT MONITOR; and International Patent Application PCT/US2019/035987, filed Jun. 7, 2019; entitled: APPARATUS, SYSTEM, AND METHOD OF PROVIDING A SHEET PRODUCT REPLENISHMENT MONITOR; which claims the benefit of priority to U.S. Provisional Application No. 62/682,039, filed Jun. 7, 2018, entitled APPARATUS, SYSTEM, AND METHOD OF PROVIDING A SHEET PRODUCT REPLENISHMENT MONITOR, the entireties of which is incorporated herein by reference as if set forth in its entireties.

BACKGROUND

Field of the Disclosure

The disclosure relates generally to sensing, and, more particularly, to an apparatus, system, and method of monitoring sheet product content levels and indicating a need for replenishment thereof.

Background of the Disclosure

It is well understood that various types of container contents, such as sheet-based products in a container, may be carried within containers designed to dispense those contents over extended time periods in discrete quantities, such as one sheet at a time. In general, such sheet product contents ultimately placed within the container are tracked only in bulk, i.e., based on the container in which the sheets, or roll of sheets, reside.

For example, containers of sheet product may be tracked by UPC code or the like, and/or such as by warehoused pallet, and so on. However, the only way a need for replenishment can be made is by the consumer at the point of dispensing of the product, such as by the consumer opening the container, looking inside the container, shaking the container to assess weight, lifting the container, or otherwise manipulating the container to allow for a qualified guess by the user as to how much content remains therein.

Further, there is historically no methodology whereby a provider of the container, i.e., a supermarket, a brand of goods, a manufacturer of goods, or the like, can assess a consumer's need for replenishment. Neither can the provider provide a manner whereby the consumer can readily assess a need for replenishment, which, needless to say, can limit re-selling of the sheet-based product.

SUMMARY

The embodiments are and include at least an apparatus, system and method for a consumable sheet-product level monitoring dispenser for association with a sheet-product filled consumable. The embodiments include at least a receiver for receiving the consumable upon insertion thereof; at least one sensor associated with at least one opening in the receiver; a sensing module for receiving sheet-product level data from the at least one sensor; and a communications module for communicating the sheet-product level to at least a mobile device display and over at least one network to at least one back end module.

BRIEF DESCRIPTION OF THE DRAWINGS

The disclosure is illustrated by way of example and not limitation in the accompanying drawings, in which like references indicate similar elements, and in which:

FIG. 1A illustrates aspects of the embodiments;
FIG. 1B illustrates aspects of the embodiments;
FIG. 1C illustrates aspects of the embodiments;
FIG. 2A illustrates aspects of the embodiments;
FIG. 2B illustrates aspects of the embodiments;
FIG. 2C illustrates aspects of the embodiments.

DETAILED DESCRIPTION

Figure 3A:
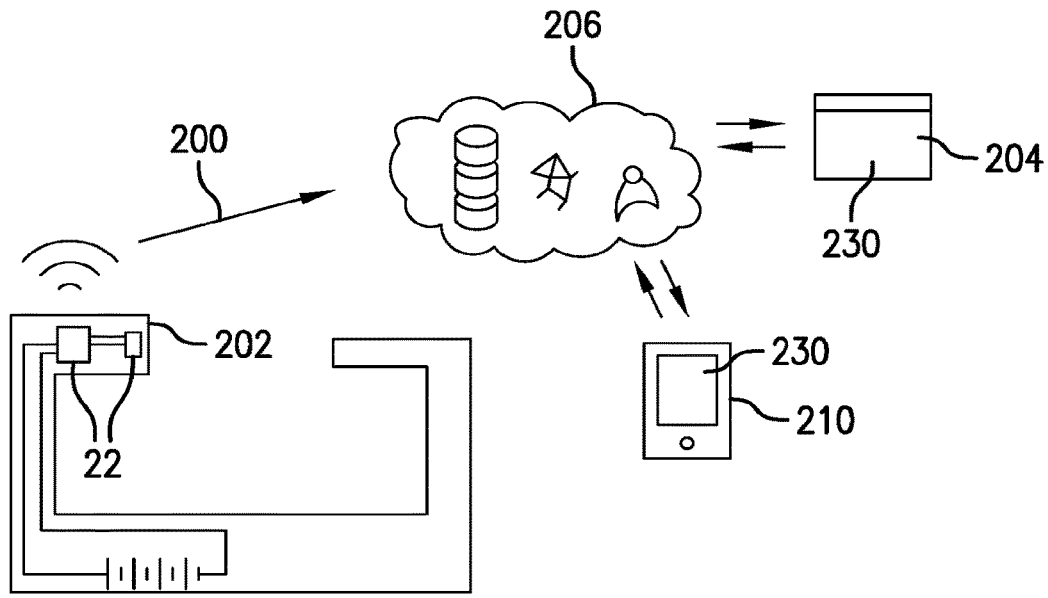
FIG. 3A illustrates aspects of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element, step or layer is referred to as being "on", "engaged to", "connected to" or "coupled to" another element, step or layer, it may be directly on, engaged, connected or coupled to the other element or layer, or intervening elements, steps or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, steps, layers and/or sections, these elements, components, regions, steps, layers and/or sections should not be limited by these terms. These terms may be only used to distinguish one element, component, region, step, layer or section from another element, component, region, layer or section. Terms such as "first," "second," and other numerical terms when used herein do not imply a sequence or order unless clearly indicated by the context. Thus, a first element, component, region, step, layer or section discussed below could be termed a second element, component, region, step, layer or section without departing from the teachings of the exemplary embodiments.

Processor-implemented modules, systems and methods of use are disclosed herein that may provide networked access to a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Furthermore, it will be understood that the terms "module", "engine", "code", "application" and "software", as used herein, do not limit the functionality to particular physical modules, but may include any number of tangibly-embodied software, firmware and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (which may work in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Python, Objective-C, Javascript, CSS, XML, etc.).

In modern commerce, a great many products come in the form of stacked or rolled sheets of the products, often inside a container, such as a disposable box or cylinder containing the sheets. For example, stacked or rolled sheet products sold within a box include sandwich bags, facial tissue, baby wipes, disinfecting wipes, printer paper, napkins, and the like. Rolled sheets of products that often are provided in boxes may include aluminum foil, plastic wrap, parchment, wax paper, printer paper, and so on.

In the foregoing circumstances, in order to assess a need for replenishment, the user must gauge her own use of the product. That is, the user must look into the box, often removing the product from the box or other container, lift the box, and/or shake the box to assess whether replenishment of the product is necessary. As such, there is presently no way for the consumer fully to automate repurchase and replenishment of the product when the product reaches a level at which the consumer, the providing brand or manufacturer, or another entity would wish to alert the consumer that replenishment is needed.

In prior efforts, the consumable product may typically be associated with an RFID or NFC Tag, a Q.R. code, a barcode, a UPC code, or the like, which, when read by a paired sensor, serves merely to identify the consumable. In contrast, the proposed embodiments may place sensors on, or in, a receiving durable device that pairs with the consumables such that a wealth of information beyond identification may be sensed or otherwise conveyed about the consumable, such as exclusively and only upon pairing of the consumable with the durable. That is, the disclosed durable aspects may include a plurality of conventional electronics designed to sense/read the detailed consumable information provided by the consumption sensor. Accordingly, the disclosed embodiments may provide functionality beyond mere identification, and may provide significant cost advantages over RFID, NFC, or optical reading methods previously provided.

FIGS. 1A, 1B, and 1C illustrate a hardware solution to the foregoing need to alert a consumer, brand and/or manufacturer of the need for replenishment or to automate a replenishment. In the illustrations of FIG. 1, the sheet based product 10 may be provided within a full container 12. This container 12 may serve as a disposable purchased container in which the stacked or rolled product is provided, or may be a durable repeat-use full container into which the purchased disposable container, such as the disposable box of sheet product, may be placed. As such, and as illustrated in FIG. 1B, the top/lid 14 of a durable full container 12 may open to allow placement of the purchased product box inside. Of note, the purchased sheet product 10 may be placed inside container 12, within or without its original packaging from the point of purchase. As used herein, it will be understood that the durable aspect 14 discussed throughout may be generic or proprietary. That is, a proprietary durable may be operable only with a particular brand of consumables, and hence other brands of the same type of consumable will not operate with the proprietary durable.

Once placed inside the container 12, or upon purchase of the product within the full container 12, the topmost portion of the container 14 may be closed, either temporarily if the product is purchased and placed within a durable repeated use container, or permanently if the product is purchased within its own single use full container. In either case, the topmost portion of the container 14, i.e., that portion through which sheets removed from the container will pass, may have a removal opening 20 that may be equipped with one or more sensors 22 to sense removal of product. By way of non-limiting example, such sensor(s) 22 may include one or more proximity sensors that may sense a sheet 10 as it is removed through the opening 20 of the container 14. Accordingly, sensors 22 may be paired, such as in embodiments wherein the sensors "look" across the opening of the container at the point through which sheets are removed.

Of course, a variety of sensing methodologies may be employed as sensor(s) 22, such as, but not limited to, time-of-flight, infrared or ultrasound proximity sensing In accordance with the disclosure, the sensor output may be active or passive, as discussed throughout. In any case, the output of the sensor(s) 22 may be provided to one or more processing systems, as discussed further herein with respect to FIG. 3.

An exemplary time of flight sensor may be accurate in a range of 5 mm to 2000 mm, by way of non-limiting example. In operation, a time of flight infrared proximity sensor may bounce infrared light off of the dispensed product, and measure the time elapsed for the infrared light to reflect back to the sensor. Of course, the sole use of a proximity sensor may lead to false readings, such as due to reflection from sunlight, user's clothing, clear sheets, or simply from the user reaching into the container and not taking out a sheet; such misreads may be remedied by the aspects discussed herein. By way of example, an additional proximity sensor may remedy the misreads that may be provided from an one proximity sensor, or two types of proximity sensors (e.g. ultrasound and infrared) may remedy the misreads provided from one type of proximity sensor. Multiple such sensors in combination may mitigate any drawbacks discussed herein.

Thus, as is illustrated in the example of FIG. 1C, a disposable box 12 of the sheet product 10 may be placed inside the durable box 12/14, and the product 10 may be removed from the disposable box 12 through one or more openings 20 in the durable container 14. As shown, upon removal of the product 10, the product 10 may pass in front of the sensor 22 discussed herein, thereby indicating via the sensor data a single usage of the sheet product 10.

FIGS. 2A, 2B, and 2C illustrate embodiments similar to those discussed herein with respect to FIG. 1, with the difference that only a durable lid 14 is provided for placement over a disposable container in accordance with the illustrations. As is evident in FIG. 2A, the durable lid 14, inclusive of the sensor 22 discussed herein, may be placed on a disposable or consumable box, pouch, stack, or the like 12, such that product 10 removed through the opening 20 of the durable lid 14 and in front of the sensor 22 may be tracked as discussed throughout.

Of note, and as illustrated in FIGS. 2B and 2C, the lid 14 of FIGS. 1A, 1B and 2A may additionally include one or more secondary seals, additional lids, or the like 100, such as to hold in or out moisture or contaminants. That is, the secondary cover 100 may serve, at least in part, to cover the opening 20 of the topmost portion of the durable container 14 through which the sheet product 10 is removed.

Figure 3B:
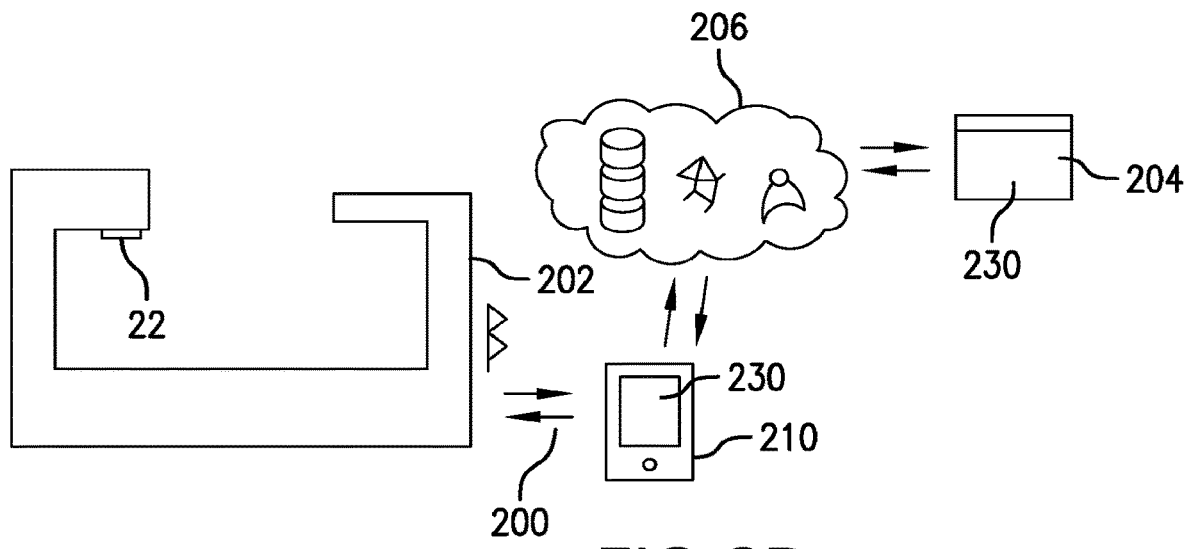
FIG. 3B illustrates aspects of the embodiments.
Figure 4A:
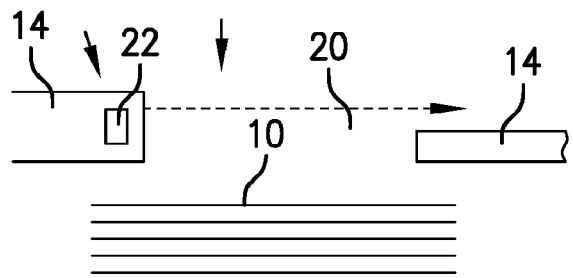
FIG. 4A illustrates aspects of the embodiments.
Figure 4B:
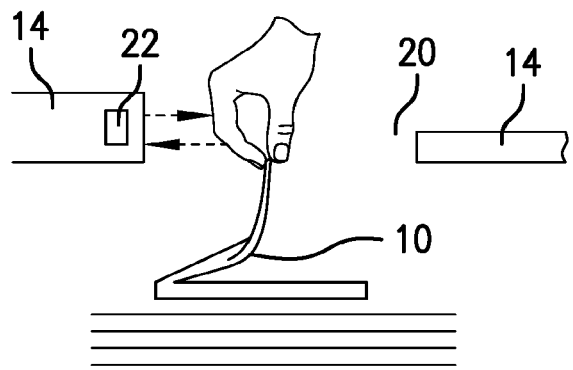
FIG. 4B illustrates aspects of the embodiments.
Figure 4C:
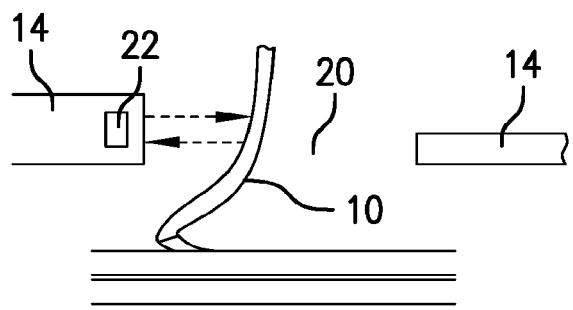
FIG. 4C illustrates aspects of the embodiments.
Figure 4D:
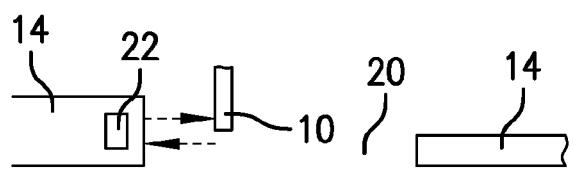
FIG. 4D illustrates aspects of the embodiments.
Figure 5A:
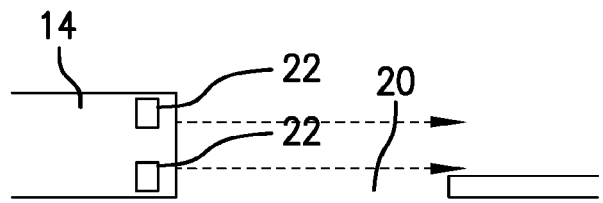
FIG. 5A illustrates aspects of the embodiments.
Figure 5B:
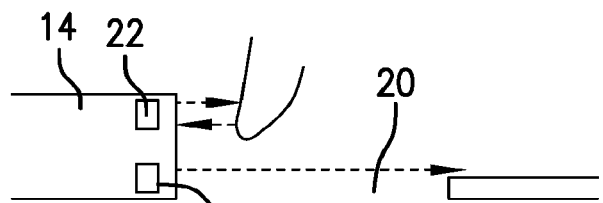
FIG. 5B illustrates aspects of the embodiments.
Figure 5C:
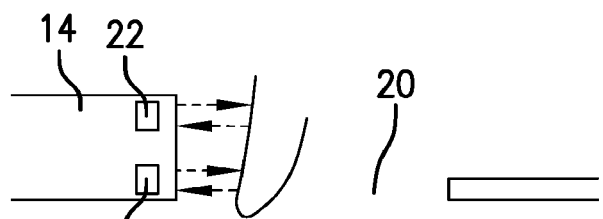
FIG. 5C illustrates aspects of the embodiments.
Figure 5D:
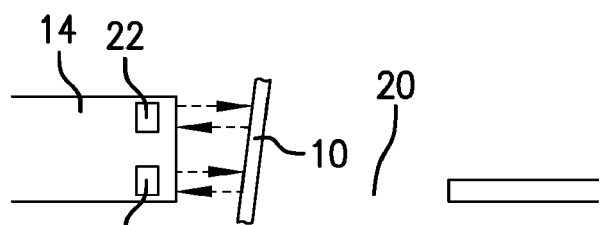
FIG. 5D illustrates aspects of the embodiments.
Figure 5E:
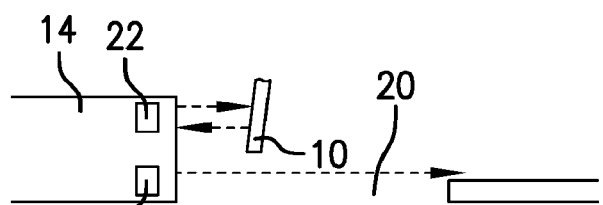
FIG. 5E illustrates aspects of the embodiments.

FIGS. 3A and 3B illustrate circuit level and communication aspects for the sensor 22 within the durable lid 14 discussed herein. As shown, the sensor 22 may sense removal of the sheet product 10 as discussed herein throughout, and may relay this sensor data 200, such as upon each use or in a batched manner upon multiple uses, using a communication transceiver, such as may include one or more antennae 202, to one or more backend replenishment assessment modules 204. As shown in FIG. 3, this communication from the sensor 22 may occur via Wi-Fi, cellular, Bluetooth, or the like, and consequently may occur directly, such as via the cloud 206, with the replenishment backend 204, or indirectly through a secondary device 210, such as a mobile phone. This communication may occur in order to convey the information to the secondary device 210 and/or to the replenishment backend 204.

Accordingly, software and/or firmware aspects associated with backend 204 and/or device 210 may include level sensing and/or replenishment algorithms 230. That is, further included within the algorithms 230 may be the ability to define and communicate the level from the sensing. Additionally, network communications, such as WiFi communications, may be included in, or otherwise controlled by, the firmware or software algorithms 230. Thereby, level sensed updates may be communicated from the durable dispenser sensor 22 to the smart phone 210 and/or to the backend 204 at appropriate or requested intervals.

Yet further, autoreplenishment indications to be generated from the firmware or software 230 based on received sensor data 200 may comprise intelligence within the user device's app 230 or within the cloud backend modules 230. Accordingly, network communications or placement of an order may be triggered by changes in sheet level (such as continuously or periodically), the need for auto replenishment as set by the consumer or a brand, or the like, and hence communications may occur on fixed time intervals, continuously, or at intervals of variable frequency.

That is, based on the ability to wirelessly communicate the sensing discussed herein, the need to replenish a product may be assessed and communicated to a local device, such as a mobile device, and/or to the backend system 204 discussed herein. As such, semi-automatic or automatic replenishment of sheet based product may be provided, and this need for replenishment may be communicated to the user, a vendor, a manufacturer, or a brand provider of a product, by way of non-limiting example.

In accordance with the foregoing, the user app 230 may additionally include various aspects. For example, the smart phone app 230 may be enabled to discover and pair with the firmware of the durable dispenser sensor 22, such as when the dispenser sensor 22 is activated or "turned on". The smart phone app 230 may display autoreplenishment requests or confirmation, such as in a user dialogue format. Further, the smart phone app 230 may display a current sheet level, and/or the frequency of updates for the sheet level.

The app 230 may additionally include the capability to receive discounts and targeted messaging, such as from the brand's dashboard 230 at module 204. These may be in the form of a push notification or a user dialogue that provides an app alert in the user's app 230 to accept and/or apply the discount code, such as wherein the discount code may be saved for the next order or applied to a current order. Of course, the consumer app 230 may include the ability to change any one or more of the foregoing settings or any additional settings, such as autoreplenishment settings, such as wherein the sheet level percentage threshold may be varied for an autoreplenishment indication. The foregoing may be available in the user app or the brand dashboard at the cloud backend from a drop-down or similar menu, a pop-up window, or via any known user. Thus, the ability of sensor 22 to remotely communicate with a smart phone 210, such as having a dedicated app 230 by brand, seller type (such as supermarket), or manufacturer may allow the user to change settings, assess the need for replenishment, be provided with a visualization of product level, confirm or request purchases, explore related products from the same manufacturer or competitive products from other manufacturers, or the like interaction, by way of example.

The dashboard 230 at backend 204 referenced herein may additionally include other particular aspects. For example, the dashboard may include autoreplenishment event data, particular user information, location-based information, and the like. Further, the dashboard 230 may integrate third-party data, such as weather data, to allow for data fusion between sensed data and publicly available data sources, such as in order to optimize sales.

The dashboard 230 may also include one or more search capabilities. That is, a dashboard user may search for particular data across one or more users, such as "frequent users", "fading users" (i.e., a list of users whose frequency of use has fallen relative to long-term usage), certain geographic searches, usage associated with certain events (such as snowstorms), and the like. Responsive to the search, and otherwise available from within the dashboard 230, may be a consumer data display. That is, dashboard events, such as autoreplenishment events, may include drill down capabilities to obtain more detail. The drill down may include basic information, such as approximate location, and more particular information, such as dosing events or liquid levels over time.

The dashboard 230 may additionally include an ability to design marketing campaigns and/or discount codes. For example, discount codes may be provided based on the meeting of certain thresholds by certain data of consumers. Thereby, the discount codes may be automatically generated upon the trigger event for one or more consumers, or may be "hard entered" by a person controlling the dashboard 230. Moreover, the foregoing aspects may overlap, such as wherein discount codes are readily executed, such as responsive to a single click, to all consumers that have been returned responsive to an entered search within the dashboard.

Additional aspects may be provided by the cloud based backend 204. The cloud based backend 204 may store data, including autoreplenishment events, by way of example, and may be suitable to serve that data back to the smart phone app 230 and/or to the dashboard 230 as needed. Further, certain of the decision-making algorithms discussed herein throughout may also reside at the cloud based backend, such as rather than residing in a smart phone app. That is, the remote communication capabilities discussed herein may allow for "piggybacking" by device 210 for the use of cloud based data storage, remote device provisioning, offloading of heavy processing, user management, creation of content targeted to demographics or user type, to backend 204, by way of non-limiting example.

FIGS. 4A, 4B, 4C, and 4D illustrate embodiments of sensing of removal of the sheet product 10 through the opening 20 of a durable lid 14 by the sensor 22 as discussed throughout. It will be appreciated that FIG. 4 provide illustration by way of cross-section for removal of a stacked or rolled sheet product 10.

As shown, the opening 20 of the container includes a sensor 22, such as a time of flight proximity sensor. This sensor 22 may detect opaque and/or clear products, such as reclosable plastic bags, plastic wrap, baby wipes, and aluminum foil, which are manually removed through the opening 20 of the lid 14.

Dependent upon the type of sensor 22 employed, the configuration of the lid 14 and the opening 20 therein may vary. For example, to the extent a time of flight sensor is used, one side of the lid 14 may be lower than the other to avoid the reflection of light back into the time of flight sensor 22, which might otherwise cause improper sensing.

As is evident, the sheet 10 being pulled through the opening 20, and/or the insertion of a human hand or finger into the opening 20 to grasp the product 10 for removal, may reduce the distance traveled by the light beam of a time of flight proximity sensor, which light beam is accordingly measured by the sensor. Of course, in such instances, the sensor may be subject to misreading the insertion of a hand without removal of a product as a decrement to the amount of product still in the container. This may, of course, be addressed by varying the type of sensor, reading of both the hand and the product removal, such as based on sensor timing, or via other methodologies as discussed throughout.

By way of non-limiting example, FIGS. 5A, 5B, 5C, 5D, and 5E provide a sensing embodiment to address the prospective misreading that may occur in the embodiment of FIG. 4. By way of example, two sensors 22, such as two time of flight sensors, may be stacked atop one another, such that one is closer to the outside of the container and the other is closer to the inside of the container. Thereby, the direction of motion of a user's hand or the product 10 being removed may be established. Further, other aspects, such as the angle of the object sensed, and the timing of movement of a hand or product 10 between the two sensors 22, may be assessed based on differences in the distance and time detected by the sensing of each of the two sensors 22. Moreover, it will be appreciated that more than two sensors 22, or sensors of varying types, may be included in the embodiments to address the misreading concerns discussed herein.

By way of example, the sensor discussed herein may be placed off-center across the opening of the disclosed lid. Accordingly, as a user is most likely to insert her hand in the approximate center of the lid, the sensor is less likely to be triggered by the presence of the user's hand or movement thereof, but is still likely to be triggered by the product which is more likely to span the majority of the opening, as sheet products are typically sized in accordance with the width of the container in which they reside. Thereby, removal of the sheet product is highly likely to trip a sensor that is off-center as to the opening of the lid, but the user's hand, which is typically inserted approximately at the center of the opening, is less likely to trip the disclosed off-center sensor. Of course, such concerns may be addressed in other ways, such as placing one sensor in the approximate center of the opening, and one off-center sensor, such that the center sensor, when triggered, is likely triggered by the user's hand, and such that both the center and off-center sensors are likely triggered by the product. Accordingly, user access to the container, and removal of the product, may be measured separately in such an embodiment.

Of course, the use of a durable repeated use container may provide secondary functionality in addition to tracking the removal of the product. For example, the durable container may have a warmer therein, such as to warm baby wipes; may include a cutting-edge therein, such as one placed substantially out of reach of a user's hand, such as in order to cut foil or plastic wrap; the container may have decorative aspects associated therewith and/or with the lid thereof; or the container made provide mounting aspects, such that the container may be mounted to a wall or cabinet, such as in order to save counter or drawer space necessary for the dispensed product.

As discussed throughout, the automatic reordering envisioned herein may reflect a need to reorder not only a consumable, but additionally a durable aspect of the disclosed system. The need to replenish the durable lid or container may, for example, be alerted by an app that tracks the total number of individual sheet uses, sensor activations, number of consumables placed therein and removed, and so on.

In the foregoing Detailed Description, it can be seen that various features are grouped together in a single embodiment for the purpose of streamlining the disclosure. This method of disclosure is not to be interpreted as reflecting an intention that the embodiments require more features than are expressly recited herein.

What is claimed is:

1. A consumable sheet-product level monitoring dispenser for association solely with a single brand of sheet-product filled consumable in a disposable purchase container, comprising:
   a receiver for receiving the consumable within the disposable purchase container upon insertion thereto of the disposable purchase container;
   at least two distinct types of proximity sensors associated with, positioned proximate to, and sensing parallel to and across at least one opening in the receiver to reconcile misreads between each other;
   a sensing module for receiving sheet-product level data from the at least two sensors only if the disposable purchase container is from the single brand as indicated by a marking on the disposable purchase container;
   a communications module for communicating the sheet-product level to at least a mobile device display and over at least one network to at least one back end module; and
   an app that displays on the mobile device display and that communicates with the communication module, which provides a confirmation of an automated replenishment order based on the sheet level product, and which provides a discount with the automated replenishment order.

2. The monitoring dispenser of claim 1, wherein the receiver comprises a durable container.

3. The monitoring dispenser of claim 2, wherein the durable container is repeat-use.

4. The monitoring dispenser of claim 1, wherein the sheet-product comprises a stack.

5. The monitoring dispenser of claim 1, wherein the sheet product comprises a roll.

6. The monitoring dispenser of claim 1, wherein at least a portion of the at least two sensors are in a first portion of a lid of the receiver, wherein the first portion is higher than a second portion of the lid.

7. The monitoring dispenser of claim 1, wherein the receiver is generic.

8. The monitoring dispenser of claim 1, wherein at least a portion of the at least two sensors comprises an ultrasound sensor.

9. The monitoring dispenser of claim 1, wherein the at least two sensors comprises at least paired sensors on opposite sides of the opening.

10. The monitoring dispenser of claim 1, wherein at least a portion of the at least two sensors comprises at least one of a time-of-flight, an infrared.

11. The monitoring dispenser of claim 10, wherein the time of flight sensor has an accuracy range of 5 mm to 2000 mm.

12. The monitoring dispenser of claim 1, wherein at least a portion of the at least two sensors are active.

13. The monitoring dispenser of claim 1, wherein at least a portion of the at least two sensors are passive.

14. The monitoring dispenser of claim 1, wherein the receiver comprises solely a lid for the consumable.

15. The monitoring dispenser of claim 1, wherein the consumable comprises one of a box, pouch, or stack.

16. The monitoring dispenser of claim 1, wherein the receiver comprises moisture proofing.

17. The monitoring dispenser of claim 16, wherein the moisture proofing comprises a secondary seal.

18. The monitoring dispenser of claim 1, wherein the communicating comprises a batched communication.

19. The monitoring dispenser of claim 1, wherein the network comprises one of Wi-Fi, cellular, and Bluetooth.

20. The monitoring dispenser of claim 1, wherein the network comprises the cloud.

* * * * *